Oct. 3, 1950     C. F. LLOYD-YOUNG     2,524,323
CUTTING AND SANDING DEVICE
Filed Feb. 21, 1947
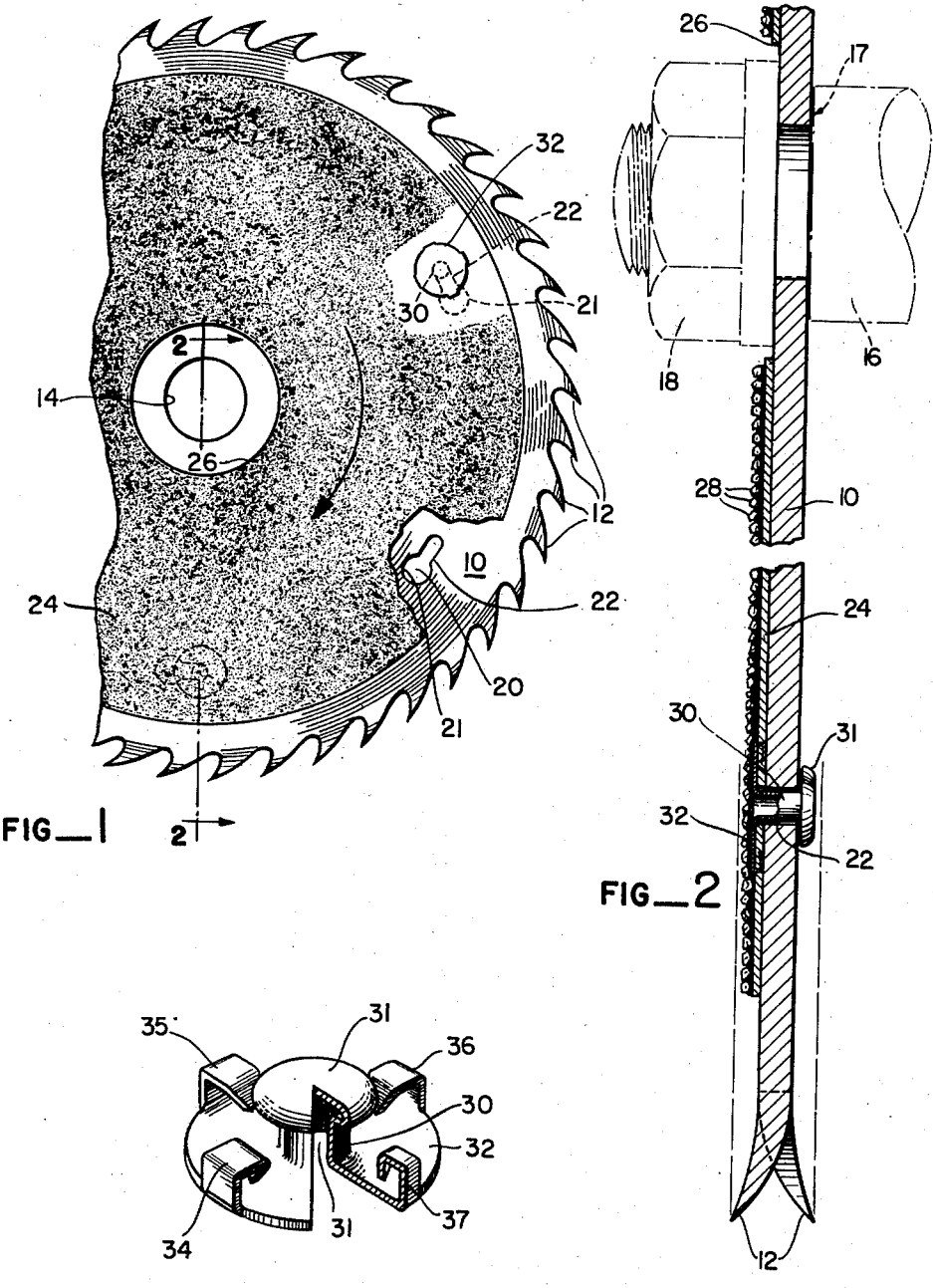
FIG_1
FIG_2
FIG_3
CARYSFORT F. LLOYD-YOUNG
*INVENTOR*
BY Smith & Tuck
*ATTORNEYS*

Patented Oct. 3, 1950

2,524,323

UNITED STATES PATENT OFFICE 2,524,323

CUTTING AND SANDING DEVICE

Carysfort F. Lloyd-Young, Seattle, Wash.

Application February 21, 1947, Serial No. 730,097

2 Claims. (Cl. 51—195)

This invention relates to improvements in cutting and sanding devices and, more particularly, to the association with a circular saw of a sanding surface.

It is an important object of my invention to adapt a sanding surface to a circular saw so that the saw is normally used and the sanding surface will not interfere with the usual cutting functions of the saw.

Another object of my invention is to provide, in a saw of the type described, a sanding surface that is readily attached to a saw and is easily and simply replaced.

A still further object of this invention is the provision of a replaceable sanding surface for a rotary face plate or circular saw, which will have a long and useful life and which will not become dislodged during use.

The foregoing objects and other ancillary thereto, I prefer to accomplish as follows:

According to a preferred embodiment of my invention, I dispose on one face of a rotary saw or similar element a disc carrying abrasive material and operable to sand objects positioned against said face. Specifically, the rotary base element is provided with a plurality of keyhole slots and the sanding disc has a plurality of T-shaped pins located to pass through, and be secured in, the keyhole slots when the sanding disc is to be used. The manner of mounting the pins to the sanding disc is an important phase of my invention and the means employed for this purpose is likewise of importance. The means for holding the sanding disc to the circular saw face is arranged so that a uniform and plane surface is provided at all times. Such being the case, when the sanding disc has been used and is worn, there is no surface more outstanding than any other in the form of a hump or bump, which would interfere with the production of a smoothly sanded surface.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a fragmentary view in side elevation of a rotary saw blade adapted with my invention;

Fig. 2 is a cross sectional view taken on line 2—2 of Fig. 1 from the axis outward of the blade and sanding disc; and Fig. 3 is a perspective view, partially in section, of a fastening pin employed in my sanding disc.

A sanding disc for use with saws should have at least two totally distinct characteristics; it must be capable of being easily attached and detached from the blade which carries it; and it must also provide a plane sanding surface which does not have humps that during sanding would cut into and groove the object being sanded.

Accordingly, a preferred embodiment of my invention, referring to Figs. 1 and 2 of the drawing, is constituted by a rotary saw disc, onto one face of which is mounted an abrasive-bearing sanding disc, and between which saw and sanding disc is suitable, quickly detachable fastening means. Disc 10, here shown as having cutting teeth 12, is provided with the usual axial opening 14 by which it is slipped on arbor 16 to be secured by nut 18.

Suitably arranged around the axis of disc 10 is a plurality of keyhole slots 20 of the type having a larger entrant opening 21 and a smaller communicating slot 22.

The sanding disc, which is preferably formed with a backing of tough paper or cloth, is designated by the numeral 24, and has an opening 26 at the axis so that the disc may be slipped over nut 18 when disc 10 is attached or removed. Abrasive particles 28 of any desired type and size are adhesively, or otherwise, suitably attached to the sanding face of the disc 24.

The fastening means, co-operable with the keyhole slots 20, comprises pin shank 30, having the enlarged head 31 and the flanged base 32. Around the periphery of the base is a plurality of upstanding bent-over retaining hooks 34, 35, 36, and 37. In this instance, the interior of pin 30 is shown as hollow. The attaching pin 30 and its head 31, as well as the flanged base and overhanging attaching hook, may be formed and attached to the disc 24 in a single extruding and forming operation conducted and performed by dies designed and shaped to produce the object shown in Fig. 3.

It will be observed in Fig. 2 that an ordinary circular saw has the teeth 12 "set" alternately to one side and then to the other of the general plane of the blade or disc body 10. Thus, the saw teeth overhang the abrasive disc on one side and the heads 31 of the pins 30 on the other side. When a board is sawn, the sanding disc and its attaching means does not interfere with the cutting operation.

When the pin flanges 32 are attached to the sanding disc backing by having hooks 34—37 inserted therethrough—it being understood that extreme thinness is always maintained—they are heavily pressed to slightly compress the backing and to reduce to the minimum the disc thickness at the point of attachment. Thereafter, during the application of the adhesive binder for the abrasive particles, a plane is established that leaves a deposit that is thinner over the base 32 of the pin than therearound. In this way I insure that the sanding surface is planar.

As shown in Fig. 1, the saw turns clockwise. Thus, when the disc is attached, the pin heads 31 must move counterclockwise from the entrant openings 21 toward the slots 22. Once attached the disc is always driven tighter, due to the application of any pressure against the disc. When the sander disc is to be removed, the saw being held non-movable, it will be rotated clockwise and the pins removed from the large opening of the keyhole slots.

While I have shown and described particular embodiments of my invention, it will occur to those skilled in the art that various changes and modifications may be made without departing from the invention, and I therefore aim in the appended claims to cover all such changes and modifications as fall within the true spirit and scope of my invention.

Having thus described my invention, I claim:

1. A detachable abrading disc for use with rotary flat-faced annular bodies having a series of commonly directed key-hole slots arranged around the axis thereof, comprising: a disc of thin compressible, sheet material forming a backing for the abrading disc, a plurality of attaching pins passing through said sheet material with a major portion outstanding from a single face of said sheet material disc, said pins each comprising a hollow shank having a laterally disposed annular flange at each end, the flange at one end of said pin being adapted to pass through the larger portion of a key-hole slot and overlie the narrower portion of such a slot to secure the sheet material disc to said body, and the flange at the other end of each pin being substantially larger than said first mentioned flange and lying against that face of the sheet material that is opposite the face from which the pins stand out, said larger flange being thinner than the sheet material and being embedded therein by compression of the sheet material to such an extent that the thickness represented by the larger flange and the compressed sheet material is substantially equal to the sheet material uncompressed, and an adhesive adhering coat of abrasive particles on that face of the sheet material against which said larger flange is positioned and overlying said larger flange.

2. The structure according to claim 1 in which the larger flange has peripheral teeth biting into said sheet material.

CARYSFORT F. LLOYD-YOUNG.

REFERENCES CITED

The following references are of record in the file of this patent:

UNITED STATES PATENTS

| Number | Name | Date |
|---|---|---|
| 484,639 | Larish | Oct. 18, 1892 |
| 959,054 | Glover | May 24, 1910 |
| 1,139,817 | Smith | May 18, 1915 |
| 1,368,441 | Kleinman | Feb. 15, 1921 |
| 1,724,742 | Albertson et al. | Aug. 13, 1929 |
| 2,008,260 | Reineman | July 16, 1935 |